United States Patent
Sandler et al.

(10) Patent No.: US 9,336,310 B2
(45) Date of Patent: May 10, 2016

(54) MONITORING OF NEGATIVE FEEDBACK SYSTEMS

(75) Inventors: Mark M. Sandler, Jersey City, NJ (US); Nir Ailon, Baltimore, MD (US); Raoul Sam Daruwala, Brooklyn, NY (US); Ruoming Pang, New York, NY (US)

(73) Assignee: Google Inc., Mountain View, CA (US)

(*) Notice: Subject to any disclaimer, the term of this patent is extended or adjusted under 35 U.S.C. 154(b) by 1161 days.

(21) Appl. No.: 12/830,927

(22) Filed: Jul. 6, 2010

(65) Prior Publication Data

US 2015/0195295 A1 Jul. 9, 2015

Related U.S. Application Data

(60) Provisional application No. 61/223,233, filed on Jul. 6, 2009.

(51) Int. Cl.
| | | |
|---|---|---|
| *G06F 3/048* | (2013.01) | |
| *G06Q 50/00* | (2012.01) | |
| *G06Q 30/02* | (2012.01) | |
| *G06F 17/30* | (2006.01) | |
| *G06F 3/0484* | (2013.01) | |

(52) U.S. Cl.
CPC ...... *G06F 17/30864* (2013.01); *G06Q 30/0203* (2013.01); *G06Q 50/01* (2013.01); *G06F 3/04847* (2013.01)

(58) Field of Classification Search
CPC ... G06Q 30/02; G06Q 30/0201; G06Q 30/06; G06Q 30/00; G06Q 30/0203; G06Q 50/01; G06F 17/30864; G06F 3/04847; G06F 17/30616; G06F 21/554
USPC .................................................. 715/745, 751
See application file for complete search history.

(56) References Cited

U.S. PATENT DOCUMENTS

| | | | |
|---|---|---|---|
| 7,249,058 B2 | 7/2007 | Kim et al. | |
| 7,603,350 B1* | 10/2009 | Guha | G06F 17/30864 |
| 7,827,052 B2 | 11/2010 | Scott et al. | |
| 8,374,973 B2 | 2/2013 | Herbrich et al. | |
| 8,856,165 B1* | 10/2014 | Cierniak | G06Q 10/00 705/28 |
| 9,009,082 B1* | 4/2015 | Marshall et al. | 705/500 |
| 2002/0083016 A1* | 6/2002 | Dittrich et al. | 705/80 |
| 2006/0121434 A1* | 6/2006 | Azar | G06Q 30/0203 434/350 |
| 2006/0143067 A1* | 6/2006 | Calabria | G06Q 10/10 705/26.1 |
| 2007/0265803 A1 | 11/2007 | Kotsovinos et al. | |
| 2008/0147581 A1* | 6/2008 | Larimer | G06F 17/30699 706/45 |

(Continued)

FOREIGN PATENT DOCUMENTS

WO    WO2009070287 A1    6/2009

OTHER PUBLICATIONS

Sandler, Mark ; Monitoring Algorithms for Negative Feedback Systems; Oct. 28, 2009.

*Primary Examiner* — Amy M Levy
(74) *Attorney, Agent, or Firm* — Fish & Richardson P.C.

(57) ABSTRACT

A computer-implemented method for identifying on-line comments as being legitimate or illegitimate is disclosed. The method includes receiving a comment directed to a piece of on-line content, randomly determining whether to review the comment manually, and providing for review of information regarding the comment by a manual reviewer if a determination is made to manually review the comment. The chance of determining whether to review the comment manually is dependent on outcomes of prior manual reviews of received comments.

20 Claims, 7 Drawing Sheets

(56) References Cited

U.S. PATENT DOCUMENTS

| | | |
|---|---|---|
| 2008/0306830 A1 | 12/2008 | Lasa et al. |
| 2009/0119258 A1* | 5/2009 | Petty .................... G06Q 30/02 |
| 2009/0207979 A1* | 8/2009 | Russell ................. G06Q 30/02 |
| | | 379/85 |
| 2009/0210444 A1* | 8/2009 | Bailey et al. .................. 709/206 |
| 2010/0274791 A1* | 10/2010 | Chow et al. .................... 707/748 |

* cited by examiner

MONITORING OF NEGATIVE FEEDBACK SYSTEMS

CROSS-REFERENCE TO RELATED APPLICATIONS

This application claims priority to U.S. Provisional Application Ser. No. 61/223,233, filed on Jul. 6, 2009, entitled "Spam-Resistant Reputation Management," the entire contents of which are hereby incorporated by reference.

TECHNICAL FIELD

This document relates to systems and techniques for handling illegitimate submissions in on-line reporting systems.

BACKGROUND

Various on-line services permit submission of content from the public or at least from registered users. For example, photo and video sharing sites let users upload digital images and videos that they have taken, respectively. On-line classified sites allow users to upload advertisements for goods or services that they may be offering for sale to other users. Job sites may allow employers to post job listing, and prospective employees to post resumes. Other forms of sites may also be provided in appropriate circumstances.

Because such sites accept content from the general public, the services they offer may from time-to-time be abused. For example, photos containing objectionable images may be uploaded by a user. Or a post may include inappropriate language, or be directed inappropriately at another user. Other submissions may violate a terms of service agreement with the service provider in other manners. Even when the content is appropriate, systems may allow users to rate the content (e.g., on a scale of zero to five stars).

As a result, such service providers frequently provide mechanisms by which the public that views the posts can report inappropriate content or can rate the content—known as "negative feedback" systems. However, the people who report abuse may themselves be illegitimate, in that they may be objecting to an appropriate post from someone they do not like. Or, they may be marking posts as inappropriate simply out of general spite. Such malicious reports may be particularly harmful, because one does not expect the "crowd" to provide as much negative feedback as it might provide in a positive feedback system (e.g., with a 5-star rating system), and thus each report will have more influence. Malicious users may also mark a large number of posts in order to harm the reputation of the service itself, and they may work in large groups (either through many users entering manual reports, or many computers working automatically, such as under the control of a bot net) in order to overload a service provider—either in terms of an ability to provide sufficient bandwidth, or in an ability to review abuse reports so as to distinguish legitimate reports from illegitimate reports. At the same time, incorrect reports might occur innocently, as by a user accidentally clicking on a web page button, or the user not fully understanding a site's terms of service. Such users should not have their reputations harmed by infrequent mistakes.

Such negative feedback postings can be reviewed by human representatives with the assistance of automated tools, in an attempt to isolate legitimate posters from illegitimate posters, and to remove from the system bad content. However, resources for conducting such a manual review are limited, and the content systems can be extremely large and have many postings. Thus, manual review of postings should be conducted judiciously. In considering such a problem, consider the following puzzle. Alice flips a coin repeatedly and calls out the outcome without showing Bob the outcome. Alice may lie. Bob either accepts the outcome, or calls for a "check", where the true outcome of the coin flip is revealed, and Bob will catch it if Alice had lied. Now, Bob can accept all outcomes without checking and may be erroneous if Alice lied without bounds, or at the other extreme, Bob may check Alice's every call and be sure of all outcomes. But that will waste a lot of effort for Bob that could better be spent elsewhere. A goal is to achieve acceptable accuracy in the review of negative feedback, with acceptable cost of performing the review.

SUMMARY

This document describes systems and techniques that may be used to identify illegitimate submissions to a reporting system, such as a system for reporting inappropriate content submitted to an on-line system. The systems and techniques may be implemented in a scalable manner so that they can be implemented in systems having very large volumes of traffic and reporting of alleged abuses. To prevent illegitimate reports from causing appropriate content to be removed from a system, processes may be used to identify reports that are not likely to be legitimate. Such processes may, in appropriate circumstances, be robust to attacks that include: (1) a user (or group of users) producing a lot of bad reports, where the system load should not increase more than marginally; (2) multiple users (with potentially good history) trying to sink one good item by reporting it simultaneously, where the system should be resistant to attacks of this sort; and (3) a "spam wave," where lots of bad reports are received over a short period of time, and the system should degrade gracefully.

In the discussion below, a simple model for monitoring negative feedbacks is discussed that is general enough to be applicable for a variety of systems. Such a model should allow user influence to be bounded over worst case malicious users, while not wasting testing capacity on numerous standard users who might still err a little while reporting. The model involves randomized monitoring that has properties of: (1) irrespective of adversarial and colluding users who know the monitoring algorithm (but not its coin flips), the total error for any given user is bounded by $\epsilon N$ over N flags for a given $\epsilon > 0$; and (2) the number of tests performed by the process is within a constant factor of the optimal process for variety of standard users.

In one implementation, a computer-implemented method for identifying on-line comments as being legitimate or illegitimate. The method comprises receiving a comment directed to a piece of on-line content, randomly determining whether to review the comment manually, and providing for review of information regarding the comment by a manual reviewer if a determination is made to manually review the comment. The chance of determining whether to review the comment manually is dependent on outcomes of prior manual reviews of received comments.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
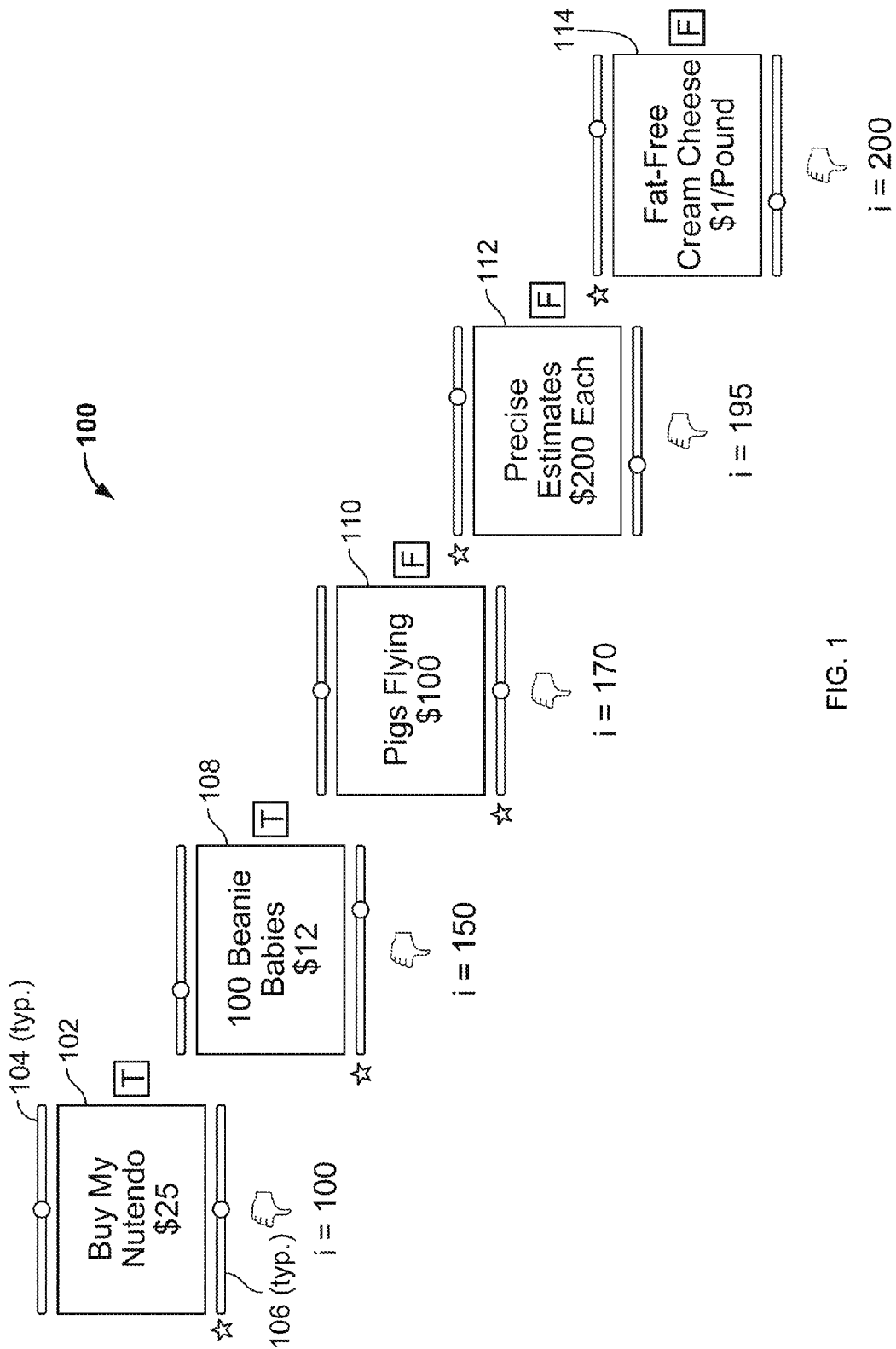
FIG. 1 is a conceptual diagram of a process for identifying feedback to on-line posts as being illegitimate.

This document describes systems and techniques for identifying abuse reports that are illegitimate. Such systems may operate on a web property that displays user-provided content (e.g., videos, blog posts, reviews etc), and that has a way for logged users to report content that they think is abusive and/or violates a terms of service agreement. To identify abusive reporting, in one example, a system may take one of three actions every time a report from a user is received: "trust," "discard," and "review." The first action means that the system simply trusts the user's report and takes appropriate action (such as removing the reported content). The second means that the system ignores the user report and does not take any action on the corresponding content. The third means that the system will forward the report information to one or more human evaluators. Each of those actions can be taken randomly, with a probability of each action depending on the past history of success of "reviewed" reports.

As an example of such a system, imagine a new user appearing in the system. If manual reviews of reports to a new piece of content reveal that the reports were bad, the system can start ignoring some of the incoming reports. The probability of a review will decrease as the system receives more and more negative reviews (under the assumption that the agreement among the multiple reviews tends to indicate that the reviews are legitimate). But nonetheless, the decision to review a report is random (though biased), so that a user making a report will not know when and which of his or her reports will be reviewed.

Similarly, if the first couple of reviews show that the reports were legitimate, the system can start to automatically bias toward trusting reports at random, and can occasionally verify some randomly chosen reports. Under this process, for any given report, the system is choosing from "review" or "trust" actions (reporting user with good report history), or "review/discard" (user with bad report history), but not from all three actions at the same time. The update procedure, in one example, operates by, every time a new report arrives and the system decides on an action, following one of three options. First, if the decision is to "discard" or to "trust," the decision probabilities do not change. Second, if the system is in review/trust mode, and the decision is to review—then if the report was correct, the probability of review for the next report from this user will decrease, but otherwise it will increase, and if the system observes two bad reviews for two observations in a row, it switches into review/discard mode. Third, if the system is in review/discard mode and the decision is to review, then if the report was correct, the probability of review for the next report from this user increases, and otherwise it decreases. And if the system is in review/discard mode, and it observes two good reports in a row, it switches into review/trust mode, with the same probability as before.

The process described here can be understood according to general intuition. In order to do so, this section first discusses a monitoring process that performs only actions of "test" and "reject." The process has its own applications. For example, if accepting an erroneous flag (e.g., removing the content which was flagged, but is not in fact spam) has a very high price, it might be beneficial to test every flag, but reject some that we believe are wrong. Similarly, a monitoring process can either "test" or "accept" (which can be motivated by legal restrictions).

Later, this document discusses how to generalize these two processes into one universal monitoring process that performs fewer tests, while having at most $\epsilon_1 N$ false positive and at most $\epsilon_2 N$ false negative errors. The basic idea of this process is, whenever flag i arrives, the process flips a $p_i$-biased coin and tests the flag with probability $p_i$ and accepts it otherwise, and after each flag, the probability $p_i+1$ is computed, potentially non-deterministically. The point is to determine the sequence of $p_i$'s. A naive approach would be to test a user at the beginning to see if the user is standard (i.e., set $p_1 = \ldots = p_k = 1$ for some k), determine p, and then thereafter run OPT for user STD(p) (i.e., use the fraction of incorrect flags out of k as $p_j$ for j>k). If the user changes strategy after k flags, however, this strategy will fail. A different approach is to fix some window size w and test a fraction $f_i$ in each window i to estimate the number $n_i$ of incorrect flags, and use $n_i/w$ as testing probability for subsequent window. Again, if the user changes his strategy between windows, this method will fail and make far too many errors.

Greater flexibility can be achieved by combining testing probability, and knowledge from each testing—if one tests flags with probability p, then upon discovery of a false flag, the expected number of missed false flags is (1−p)/p. Indeed, since each false flag is tested with probability p, the expected stopping time (1−p)/p. Thus, intuitively, if between two consecutive discoveries of false flags, the testing probability was in the range [p', p"], then we have both lower and upper bounds on the expected number of missed flags in between, as (1−p')/p' and (1−p")/p. Using this, we can keep track of approximately how many false items we have accepted (e.g. number of false positive errors), and thus can chose a new $p_i$ in such a way so that we satisfy the constraint on the number of false positives in expectation.

A process for achieving such a result may be described as follows: given an input of a stream of flags, and an output of accepting or testing a flag (and the system learning the true state for any tested flag), the process first sets a testing probability $p_i=1$, with an estimated number of skipped flag at L=0. Then, for each flag i, (a) test the flag with probability $p_i$ and accept it otherwise; (b) if the flag is tested and the flag is false, set L←L+(1−$p_i$)/$p_i$; and (c) set the new testing probability $p_i+1 \leftarrow 1/(\epsilon+1-L)$.

Particular example processes may be used to generalize such a situation to a more general case, where both "accept" decisions and "reject" decisions may be part of the decision process and the applicability of one or the other may be switched over time in the process. First, note that test-accept and test-reject cases are symmetric (with default reject action being replaced by default accept action, and L increases in the process above if the flag is true). To generalize the process above to a test-accept-reject process, one can run both processes (the test-reject process, and the test-accept process) in parallel, with only one being active and producing the next action. After each step, both processes advance a step and the process with the lowest probability of testing becomes the active process.

Such a process can be described as follows: given a stream of flags and processes A and B that guarantee $\epsilon_1 N$ of false positive and $\epsilon_2 N$ of false negative errors, respectively, and an output of test, accept, or reject for each flag, the processes A and B are run in parallel to produce probabilities $p_i^A$ and $p_1^B$. If $p_i^A < p_i^B$, set process A as active, and process B as passive. If $p_i^A >= p_i^B$, set process B as active, and process A as passive. Have the active process flip a biased coin and perform its action as normal, and update its state. Have the passive process also flip a biased coin, but only to update $P_i$ (its action is not performed and its error counter is not updated).

Applying such basic ideas, FIG. 1 is a conceptual diagram that represents a system 100 for determining when to check (e.g., by a manual review) negative feedback that has been received in a publicly accessible system. By publicly accessible, we mean that the system is open to receive negative feedback from members of the general public, or members who are registered with the system, and sufficiently open so that users cannot all be assumed to be acting legitimately (i.e., so that they need to be checked). Certain systems may permit limited interaction with content in the system for users who are not logged in (e.g., to review content), and additional interaction for users who are logged in, such as the ability to post content, comment on content, and indicate that content from other users is inappropriate (e.g., and should be blocked or removed).

The figure shows a series of boxes 102-114 that represent content postings on the system 100, where a particular user has provided negative feedback on each of the listings that are shown here. There may have been many other pieces of content that the user reviewed and did not provide any feedback on, in between viewing each of the pieces of content shown here. Also, the user provided a number of other negative feedbacks in between those shown here, as indicated by an index number ("i=100") under each box that represents the cumulative number of times that the particular user has provided negative feedback to some piece of content in the system 100. Thus, by the right edge of the figure, the particular user has provided negative feedback 200 times. The identity of the user may be correlated between discrete instances of providing feedback, by having the user log into the system 100 in various well known manners, e.g., to track a user ID.

Each box in the figure shows, conceptually, a number of parameters that are related to the feedback tracking system 100. First is the index number shown below each box, and indicated by the letter i. Second, the actual content of the post that the user reviewed is shown within each box. In the examples shown here, obviously-true or obviously-false content has been provided for purposes of illustration, so that one can more readily recognize if the user's negative feedback is legitimate (where the content is obviously false) or illegitimate (where the content is obviously true). Also, to totally confirm whether the posting is true or false (or some other factor that indicates it should be removed, such as if it is misclassified by the poster, or is spam), the figure shows a box to the right of each post, with a T or F in the box to indicate whether the post is true or false. Thus, negative feedback on a false post is legitimate, while negative feedback on a true post is illegitimate.

Two conceptual probability indicators 104, 106 are also shown above and below each box. The top probability indicator 104 indicates a propensity or probability to automatically select the negative feedback (and thus remove the content in the post from the system), while the bottom probability indicator 106 indicates a propensity or probability of the system 100 to reject the negative feedback (and thus to leave the content in place). The position of an icon on each probability indicator 104, 106 indicates the bias for each propensity or probability, which may be expressed, for example, as a number between 0 (least likely) and 1 (most likely). As discussed above and below, the particular bias levels may be used in the generation of biased random decisions that are made about the negative feedback in each cycle where there is negative feedback. While shown as dots positioned along a range (i.e., as sliders), here visually, it should be recognized that the probabilities are not something that a user would select to change the system—rather, they are shown here to reflect the bias or probability that the system applies to certain parameters at different points in time in the example.

Finally, for each box, one of the probability indicators 104, 106 is shown with a star next to it. As discussed above and below, the star indicates which of the processes—one to make a determination of whether to accept the feedback, and the other to make a determination of whether to reject—is active, and lack of the star indicates which is passive. The process for switching between active and passive is described below.

Proceeding now from the first box to the last, it should be noted that in this example, a user has provided prior instances of negative feedback to the system 100. In particular, in one implementation, the probabilities for a new user may be set initially to 1, so that all pieces of feedback are tested. Biases for a particular user may also be reset, when appropriate, and a "test everything" bias may be established then also. At the state shown by box 102, the particular user has provided trustworthy feedback, so the bias has moved closer to 0.5 by the 100th instance shown in the example in the figure.

Box 102 shows content for a classified ads system that lists a used Nintendo Game System for $25. That is a legitimate post, or at least would be deemed a legitimate post if a manual review of the post were instigated, because $25 is a seemingly legitimate price for a Nintendo (though it might not be legitimate if it were a Nintendo Wii, so that such a post would indicate that the poster was trying to lure people into a scam). The user here has provided negative feedback, so the system 100 needs to determine whether to institute a review (manual or automatic) of that feedback. At this point, the active algorithm is a rejection algorithm, so a random number is generated in a biased process, and if it exceeds a threshold value (e.g., 0.5), then a review and/or rejection will occur. The accept algorithm will also be run in the background, so that its bias value can be updated, but the result of its running will not be seen by the rest of the system 100. Both the accept and reject algorithms appear to be essentially unbiased at this point (their probability indicator icons are pretty well-centered).

At box 108, the user identifies an advertisement to sell 100 Beanie Babies for twelve dollars as being improper. For our purposes, we are assuming that the advertisement states a fair price for such objects, and would thus be judged a legitimate piece of content. However, the user who gave the negative feedback may not like the person who posted the advertisement, or may honestly believe that twelve dollars is such a ridiculously improper price for 100 Beanie Babies that the content must be false (e.g., a scam or a rip off). Notably, the user has provided about 50 other pieces of negative feedback since the time of box 102. In this situation, the reject bias, which represents the bias toward choosing to reject the user's negative feedback recommendation, has moved upward because of bad feedback by the user like that shown in box 102. The accept bias has fallen in a corresponding manner. Thus, the negative algorithm is still the active algorithm.

At box 110, twenty pieces of negative feedback later, the user actually provides accurate negative feedback, because pigs do not fly—no matter what the cost. At box 112, the user has now provided enough accurate pieces of negative feedback that the accept algorithm has a higher bias than the reject algorithm, and the accept algorithm is thus active. The user here again provides accurate negative feedback, since "precise estimates" is an oxymoron. At box 114, the probability indicators have diverged even more, with the accept algorithm biased much more highly than the reject algorithm, and the user has once again accurately identified that there can be no such thing as fat-free cream cheese—at least not any that someone would want to buy.

Thus, the system 100 provides for a continuing cyclic process by which decisions may be made to accept or reject negative feedback (or to simply pass on it), and thus perhaps to trigger a manual review of posted content, using biased random decisions. Such a system is difficult for fraudsters to "learn" because of the random nature of the review decisions. The system may also do a good job in the difficult task of balancing the need to identify as much bad content as possible, without being subject to bad feedback and without requiring an unmanageable level of manual reviews of negative feedback.

Also, the techniques described here may be combined with other screening techniques, such as techniques to ensure that users authenticate themselves with a system. Also, although the process discussed here did not make decisions about review based on the content, decisions on how to treat content and negative feedback may be content-dependent. For example, a system may, in addition to performing the actions discussed here, analyze the content for trigger words that are suspect (e.g., "FREE!"), lack of certain content (e.g., the lack of a proper geographic location in a classified advertisement, indicating that the poster may be from out of the area, and thus a scammer), and other factors. Also, the correlation between different posts and/or different pieces of negative feedback may be analyzed, such as if a particular user is always objecting to the same sort of content. Also, if a user is always objecting to content from a particular other user (and few others object to the other user), this could indicate animosity between the users, and not legitimate feedback. Various other input signals may also be used.

Figure 2:
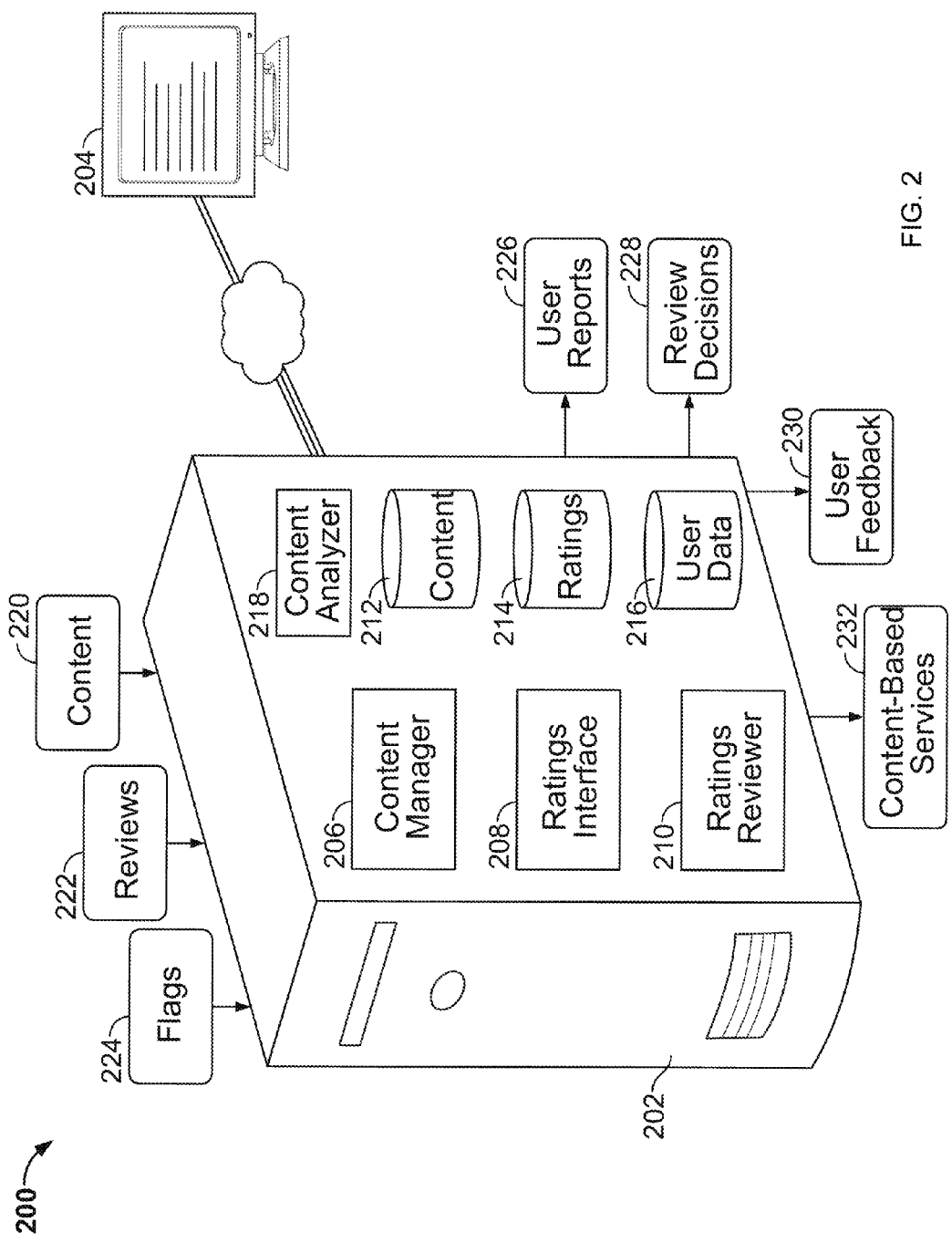
FIG. 2 Is a schematic diagram of a computer system for identifying illegitimate user feedback.

FIG. 2 is a schematic diagram of a computer system 200 for identifying illegitimate user feedback. The system 200 may operate to carry out processes like those discussed above with respect to FIG. 1, and below. In general, the system 200 may be provided as part of a content posting and comment system, such as by a shopping site (where users can comment on products, and other users can flag the comments as being illegitimate), a classified ads site (where users can list products or services for sale, and other users can identify the listings as misclassified, spam, or some other problem), or other such systems. The system 200 here is shown in a single server 202 for clarity, but the server 202 could be multiple different machines or sub-systems, could include components split across multiple servers in virtualized arrangements, and in other known ways on which computing loads may be allocated and assigned.

As shown, the server 202 receives a number of inputs, including content 200, which could be listings of products for sale, articles written by users, and the like. The server 202 may also receive reviews 222 (which are also a form of content) that are directed toward the content, such as comments on newspaper articles, on products for sale, and the like. Flags 224 received by the server may take the form of binary negative feedback from users, either to the content or to the reviews. In saying that the flags are binary, in this example, the presence of a flag indicates that the submitting user thinks the particular flagged content or review should be acted upon by the system in some way, such as removing it from being seen by other users in the future. The lack of a flag indicates that the user did not have a problem with the content or review (though, in reality, it might merely indicate that the user was too lazy to press a button for the flag, or was uncertain about whether the content was legitimate). The server 202 is arranged to determine when to trust those flags and when not to trust them, in a manner that makes it hard for people generating the flags to manipulate the system 200.

The server 202 also provides a number of different example outputs 226-232. For example, the server 202 may present user reports 226, such as in the form of information that indicates how frequently certain users present content, object to content, or have their content objected to. Such reports may join the identity of the user (which may be anonymized for analysis) to other factors, such as the identity of another user whose content the first user flagged, in order to perform multi-variant analysis on the data, such as in some of the manners discussed above.

Review decisions 228 may also be provided by the server 202, such as to human employees of the company that operates server 202, where those employees may work at terminals connected to the system 200. Such reports may identify a piece of content and the fact that a flag has been generated for the content, and the employee may follow various procedures to determine whether the flag was legitimate or not. Such a decision by the employee may be fed back to the system 200 so that determinations may be made better with respect to future flags provided by that user or against that content. User feedback 230 may take a variety of forms, and may include a message to a poster of content that their content has been removed from view because of a flag that has been accepted by the system 200. In such a situation, the server 202 may accept additional feedback from the poster of the content and may begin a mediation process, by which the poster may identify that, and why, the content was legitimate. (The person who gave the negative rating may, in certain case, be involved, and may be allowed to rebut the position of the content poster.) Such a process may be important in a system where users are assigned reputation scores, where those scores depend on the treatment of content submitted by the users, and where the scores are reviewed in order to rank the users publicly or to give users access to certain features of the system 200 (e.g., only "5-star" users have their content posted on certain pages of a publishing web site).

Various content-based services 232 may also be generated and managed by the server 202, including the various ones discuss above. Such services may thus be provided to users of computer 204. (which represents the potentially millions of computers that could access and use the system 200). The computer 204 is shown connected to the server 202 over a network such as the Internet. The computer 204 represents any number of different computers that may be used by any relevant submitter of content (whether original content, reviews, or flags) and others who want to view the content, but not be presented with illegitimate content.

Various components within the server 202 provide examples of components that can be used to provide the services discussed above and below. For example, a content manager 206 may provide well known mechanisms for users to submit, organize, and retrieve content, whether in the form of ads for products, magazine articles, or other types of content. Various types of content managers are well known.

A ratings interface 208 may be an integral part of the content manager 206 and may provide a mechanism for users to provide feedback on other users' content. For example, the ratings interface 208 may permit users to provide a one-tofive star rating or similar rating, and to leave textual comments about a piece of content. The ratings interface 208 may alternatively, or in addition, allow users to provide simple binary negative feedback, such as by clicking a button labeled "spam" that can be displayed next to the content when users pull the content up on their computers. The ratings interface 208 may present reviewers of content with a variety of options in various well-known manners.

A ratings reviewer 210 may implement processes like those discussed above and below for determining when a rating, such as a binary negative feedback, is legitimate or illegitimate. In particular, the ratings reviewer may operate on a processor in the server 202 to implement processes like those discussed in the remainder of this document for accepting or rejecting ratings, such as doing so using biased random selection. The ratings reviewer 210 may receive information about ratings that various users have provided with respect to content from the ratings interface 208, and may then make decisions about what to do with the content (e.g., either maintain the content in its currently visible state, make it available only to people who want to see potentially "damaged" content, or remove it from view by later users entirely).

The ratings review 210 may also implement a review process for decisions that it makes about content. For example, creators of content that has been blocked by the system 200 may be notified when their content is blocked, and may then log into the system 200 to explain why they believe their content should not have been blocked. For example, the ratings reviewer 210 may have initially performed an automatic review of the content in determining to block it, and intervention by the content creator may trigger a further manual review (under the assumption that few creators of illegitimate content will bother to seek such a review).

Such automatic analysis may supplement analyses like those described in this document (for reviewing negative feedback) and may be performed by a content analyzer 218. The content analyzer 218 may, for example, receive information that includes the actual posted content itself along with identifiers for the user who posted the content and the user who objected to the content. The content analyzer 218 may parse the text and/or images of the content and perform a number of tests on it. For example, images may be tested to determine whether they might show nudity, copyrighted content, or other improper content. Similarly, text may be tested against a black list of likely improper words, and may be analyzed in various known manners to identify a topic for the posting and then each of the identified factors may be combined into a "danger" score for the content that represents the likelihood that the content is illegitimate. For example, messages that mention investment opportunities and certain foreign countries, along with jailed relatives and the like, may be assigned a high "danger" score. In a similar manner, posts that sell certain unlocked telephones, jewelry, or other products that are often subject to fraudulent schemes, could also be assigned a higher score, as could posts that do not contain a legitimate geographic location for a seller when the system asks for such information. Posts with lots of exclamation points and other fields in a post may also be type-checked to ensure that they meet standards for legitimate posting.

Various data stores may also be employed in support of the features discussed here. For example a content data store 212 may store various pieces of content hosted by the system 200. The content data store 212 may also include meta data for organizing the content, such as tags, relationships between content (e.g., hyperlinks) and the like. The particular organization of the data in the content data store 212 is not critical and may depend on the particular application with which the system 200 is being used.

A ratings data store 214 may store and organization information about ratings that users have given to content in the content data store 212. Such ratings may be, for example, textual comments on the content, or numerical ratings of the content, in typical situations. The ratings may also involve negative feedback in the form of user flags of content that the users indicate as being illegitimate for some reason—whether that reason itself is legitimate or illegitimate.

A user data store 216 includes information about users who are registered with the system, using log ins, for example, to correlate user actions to particular user accounts. For example, the data store 216 may track which content in the content data store 212 was submitted by which users (when the content is user-submitted content rather than content generated by the system 200 itself). The data store 216 may also track negative ratings by users so that the analysis described above and below may be performed, such as by storing current biasing values for users, and other appropriate per-user values.

In this manner, the system 200 may provide for a complete content presentation solution for users. The system 200 may manage the presentation of content and the manner in which users interact with the content. In addition, the system 200 may permit users to comment on content, and may take actions based on those comments, such as by deciding whether to delist certain content or refusing to delist the content.

Figure 3A:
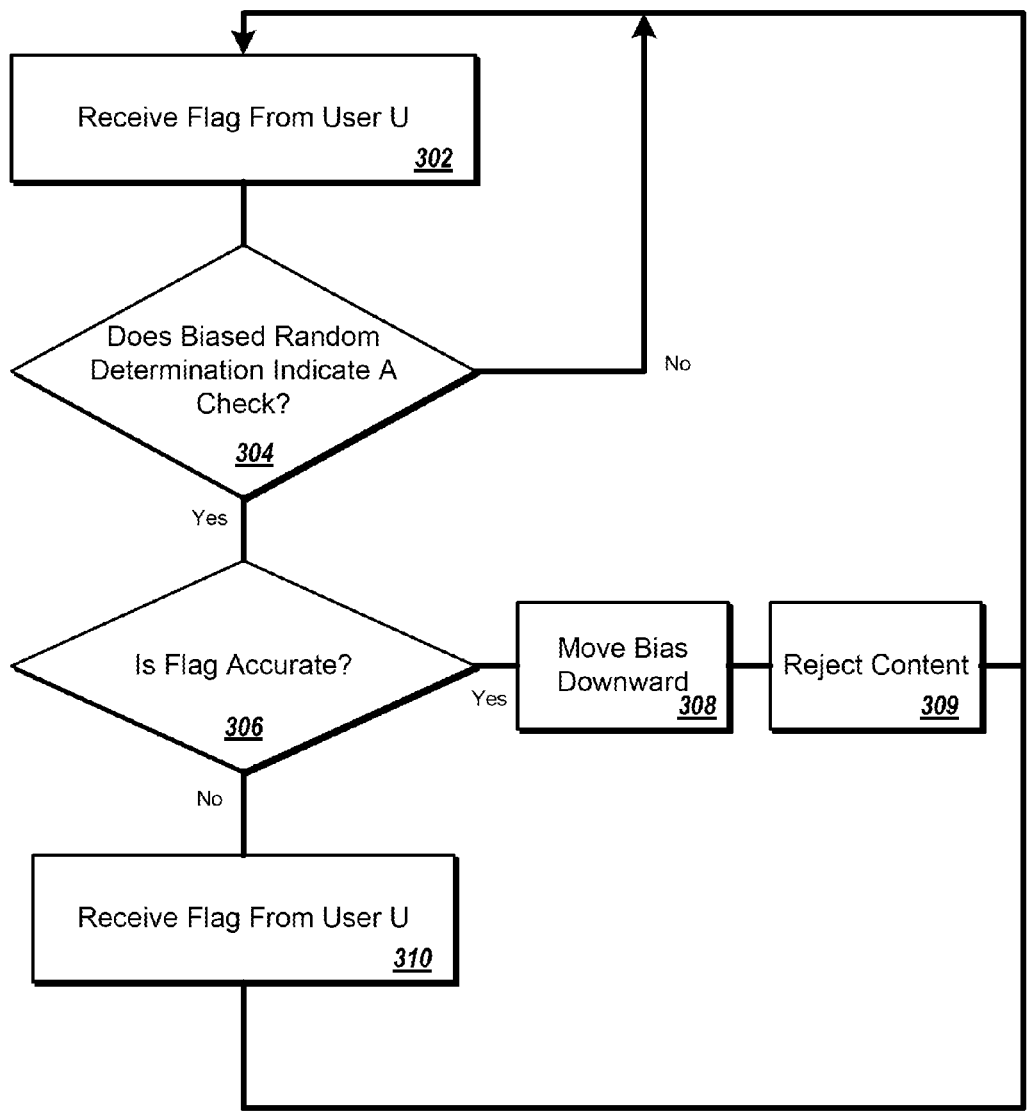
FIG. 3A is a flow diagram of a process for reviewing user flags of on-line content.

FIG. 3A is a flow diagram of a process for reviewing user flags of on-line content. In general, the process relates to the application of a biased random decision in determining whether to follow the recommendation of a user to reject content in a content management system. Such "rejection" of the content may result in the content being made unavailable on the system, or could alternatively result in the content being submitted for a manual further review by an employee of an organization that manages the content.

The process begins at box 302, where a flag is received from a user of the system. The flag may simply provide a value-less indication (i.e., the presence of the flag is all that matters, and the flag does not have a level, such as a rating) that the user objects to the content and believes that it should be removed. At box 304, a random number is determined in a biased manner, where the level of bias has been determined from prior similar actions by the user. For example, the random number may be bounded by 0 and 1, and may be biased toward one end or the other in various known manners, based on whether prior objections to content by the user were found to be accurate or inaccurate. The breaking point for making a decision for the generated ransom number in such a situation may be 0.5 or another appropriate value. If the biased random determination decides that a check should not be made, then the process cycles back to waiting for another flag from the user.

If the biased random determination decides that a check should be made, then the process forwards the content for a further check (box 306). For example, the content and indication of the flag may be forwarded to a human for further review. If that further review indicates that the flag was accurate, then the bias toward adopting a further review may be moved downward (box 308), thus indicating that the user who generated the flag has been determined to be slightly more trustworthy due to the accuracy of the one flag, and the system may also reject the content that was flagged (box 309). The relatively direction in which biases are adjusted for the random selections may vary depending on the goals for the particular system.

If the flag is determined not to be accurate, the bias may be moved upward (box 310) and the content left alone. Such movement of the bias may indicate that the flagging user's ratings are determined to be less trustworthy or accurate.

In this manner, the process shown here may provide a fair proxy for direct review in a manner that, on average, identifies an appropriate and floating percentage of flags for review, but does so in a non-determinant way so as to prevent users from attempting to circumvent the system.

Figure 3B:
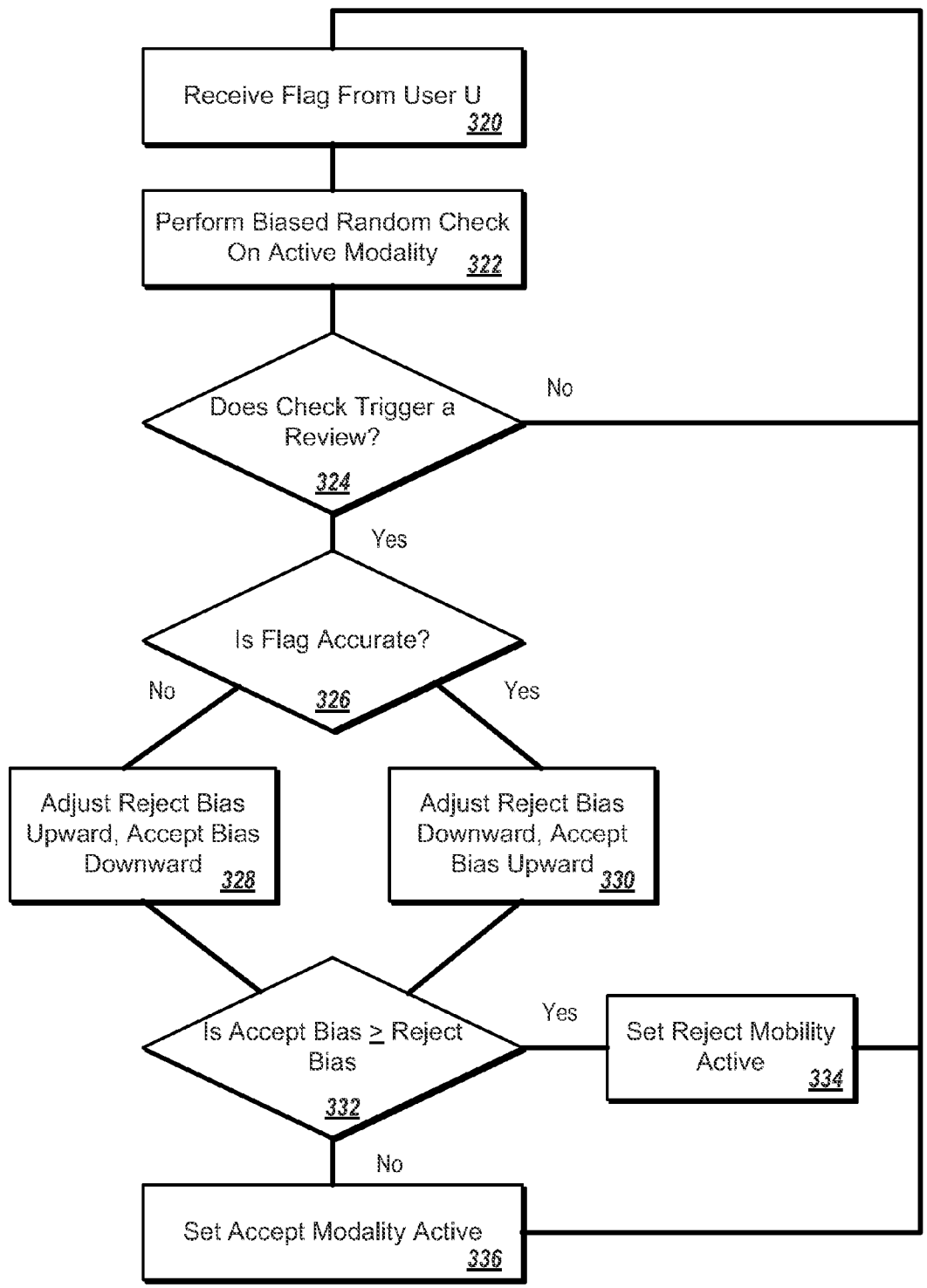
FIG. 3B is a flow diagram of a process for reviewing user flags while adjusting multiple review biases.

FIG. 3B is a flow diagram of a process for reviewing user flags while adjusting multiple review biases. The process here is somewhat similar to the process shown in FIG. 3A, but more particularly focuses on the use of separate selections for accepting a flag and rejecting a flag, and switching between using one or the other in order to make a determination about reviewing a flagging event.

The process here begins at box 320, where a flag is received from a particular user U. This step is the same as step 302 in FIG. 3A. At box 322, a biased random check is performed on the active mode, or modality. In particular, the process may be set so that a reject determination is active, or so that an accept determination is active Each such determination may be biased by a separate amount that depends on how prior determinations with respect to flags by user U have been treated. Generally, the biases move in opposite directions with respect to each other. The inactive modality may also be checked at the same time, though in the background, simply to permit updating of the bias level for that modality.

At box 324, the process determines whether the check at box 322 should trigger a review of the flag. If the determination is that no review should be performed, the process may return to waiting for a future flag from user U. If the determination is made that a review should occur, then a determination is made (such as by a human reviewer) whether user U's particular flag was accurate (box 326). In particular, a human employee of a content management company may review the content and make an independent determination of whether the content should be removed (e.g., determine that it is spam, offensive, etc.).

If the flag is accurate, based on the subsequent review, then the reject bias is adjusted downward and the accept bias is adjusted upward for use in later determinations (box 330). Such adjustments reflect the fact that the user's flags are to be biased toward trustworthiness since the particular flag was accurate. Simultaneously, the content may be rejected or otherwise blocked. If the flag is not accurate, then the reject bias is adjusted upward and the accept bias is adjusted downward (box 328) for use in future determinations.

The values for the system are then further adjusted for future determinations. For example, at box 332, a determination is made regarding which bias is now the highest bias in the system. At boxes 334 and 336, the active modality for testing of future received flags from user U is then set to the modality that has the highest value (or to reject if there is a tie).

In this manner, the process shown in FIG. 3B takes advantage that decisions to accept a flag (and thus reject corresponding content) and to reject a flag (and thus accept corresponding content) are essentially symmetric decisions. The process may provide an accurate mechanism for triggering the review of flags submitted by users in a manner that tracks the predicted likelihood that the flag is illegitimate, but without doing so in a determinant manner so that the exact operation of the system may be easily deduced from outside the system, and circumvented.

Basis for Negative Flag Review

This section includes mathematical discussions of the performance of the general review processes described above. We begin by analyzing the test-accept process, like that discussed with respect to FIG. 3A. For each flag, this process tests each flag with certain probability and accepts it otherwise. Thus, the only type of error admitted is false positives, where the process accepts a false flag (one placed on legitimate content). To determine how many undetected false flags existed between two detected ones, we estimate the run length until the first detected flag, if the testing probabilities is some non-increasing sequence $p_i$.

Under a first lemma, let $r_i$ be a sequence of Bernoulli trials with parameter $p_i$, where $p_i$ is monotonically non-increasing sequence, and $p_i$ itself can depend on outcomes of earlier trials. Let $Q \in [0, \infty]$ be the hitting time for the sequence $\{r_0, r_1, \ldots\}$. In other words, random variable Q is equal to the first index i, such that $r_i = 1$. Then, for any $\gamma$, we have $$E[Q|p_Q \geq \gamma] \leq (1-\gamma)/\gamma \text{ and } E[Q|p_Q] \leq (1-p_Q)/p_Q \quad (1)$$

$$\Pr[Q > c/\gamma | p_Q \geq \gamma] \leq e^{-c} \text{ and } Pr[Q > c/p_Q] \leq e^{-c} \quad (2)$$

As a proof, consider sequence $r_i^{(\gamma)}$, such that $r_i^{(\gamma)} = r_i$ if $p_i \geq \gamma$ and is Bernoulli trial with probability $\gamma$ otherwise. And suppose $Q^{(\gamma)}$ is a hitting time for $r_i^{(\gamma)}$. Then $$E[Q^{(\gamma)}] = E[Q^{(\gamma)} | p_Q \geq \gamma] Pr[p_Q \geq \gamma] + E[Q^{(\gamma)} | p_Q < \gamma] Pr[p_Q < \gamma] \geq E[Q^{(\gamma)} | p_Q \geq \gamma]$$

where in the first transition we used the linearity of expectation and in the second we used the fact that for any fixed sequence $$P = \{p_i\}, E[Q^{(\gamma)} | p_Q \geq \gamma, P] < E[Q^{(\gamma)} | p_Q \leq \gamma, P].$$

On the other hand, $Q^{(\gamma)}$ and Q are equal to each other if $P_Q \geq \gamma$. Thus, we have $$E[Q^{(\gamma)}|p_Q \geq \gamma] = E[Q^{(\gamma)}|p_Q \geq \gamma] \leq E[Q^{(\gamma)}]$$

To show that $E[Q^{(\gamma)}] \leq (1-\gamma)/\gamma$ and $\Pr[Q^{(\gamma)} \geq c\gamma] \leq e^{-c}$, we first observe that $Q^{(\gamma)}$ can be upper bounded by geometric random variable $G \geq 0$ with parameter $\gamma$. Indeed, let $G = \Sigma_{i=1}^n g_i$ where $g_i$ is 1 with probability $\min\{1, \gamma/p_i\}$ and $ri^{(\gamma)} = 1$, or 0 otherwise. Unconditionally, each $g_i$ is 1 with probability $\gamma$. Thus, hitting time G for $\{g_i\}$ is a geometric random variable, and by definition $G \geq Q$. Since expectation of G is $(1-\gamma)/\gamma$ we have the first part of the lemma. The second part of equation (1) follows from the definition of conditional expectation. To prove the equation (2), note that $$Pr[G > c/\gamma] = (1-\gamma)^{\frac{c}{\gamma}+1} \leq e^{-c}$$

since it is exactly the probability that a sequence of Bernoulli trials with identical probability $\gamma$, hasn't hit 1 after $c/\gamma$ steps. Because $Q(\gamma) \leq G$ in the entire space, we have desired bound.

As a theorem, consider that, for a test-accept monitoring algorithm, the expected number of errors $e_u(N) \leq \epsilon N$ for any user $\underline{u}$.

As a proof of the theorem, we count the expected number of undetected false positives after we test the ith flag. The crux is to consider the underlying sequence of false flags and corresponding testing probability, and hide all the true flags inside the probability changes pi and apply the first lemma from above. Suppose the false flags have occurred at positions $f_1, f_2 \ldots f_{l'}$. We do not know what those $f_i$ are, but our goal is to show that for any sequence, the desired lower bound holds. Denote $r_i$ a random variable that indicates whether i-th false flag has been rejected. In other words $r_i$ is a sequence of bernoulli trials that each occur with probability $1-p_{fi}$. Consider $g_0, g_1, \ldots g_{l'}$ where $g_0=f_1$, $d_m=f_l$ and $g_i$ is an index of the ith detected false flag. In other words $\{g_i\}$ is a random subsequence of $\{f_i\}$ where the process detected a false flag. Note that while $f_i$ are unknown, $g_i$ are the steps of the process where we test and discover false flags, and they are thus known. Let $R_i$ denote a random variable that is equal to the number of false flags between flags gi−1 and gi.

It is easy to see that $R_i = \Sigma_{j:g_{i-1} \leq f_j < g_i}^{r_2}$. For that reason, $\Sigma_{i=1}^{l'} R_i = \Sigma_{i=1}^{l} r_i$. Therefore, it is sufficient for us to estimate $E[\Sigma_{i=1}^{l'} R_i]$. Note that $R_i$ is a hitting time for the sequence in the first theorem. Thus, using the first lemma from above $$E[R_i | p_{gi}] <= (1-p_{gi})/p_{gi}$$

Further note that for fixed $p_{gi}$, the expectation is bounded independently of all earlier probabilities and therefore:

$$\sum_{i=1}^{l'} E[R_i | p_{g_0} \ldots p_{g_i}] = \sum_{i=1}^{l'} E[E[R_i | p_{g_i}] | p_{g_1}, \ldots p_{g_{i-1}}] \leq \sum_{i=1}^{l'} \frac{1-p_{gi}}{p_{gi}} \leq \varepsilon N.$$

where the last transition follows from the test-accept process step in which the new testing probability is set, where we have $p_{gi} = 1/(\epsilon(g_i-1)+1-L)$ and thus $(1-p_{gi})/p_{gi} <= \epsilon g_i - L_{gi}$, where $$L_{gi} = \sum_{j=1}^{i} \frac{1-p_{g_j}}{p_{g_j}}.$$

and hence $$\sum_{i=1}^{l'} \frac{1-p_{gi}}{p_{g_1}} \leq \varepsilon N.$$

To finish the proof $$\sum_{i=1}^{l'} E[R_i] = E\left[\sum_{i=1}^{l'} [R_i | p_{g_1}]\right] \quad (3)$$

$$= E\left[E[R_1 | p_{g_1}] + \sum_{i=2}^{l'} E[R_i | p_{g_1}]\right]$$

$$= E[E[R_1 | p_{g_1}] + E[R_2 | p_{g_1}, p_{g_2}] + \quad (4)$$

$$\sum_{i=3}^{l'} E[R_i | p_{g_1}, p_{g_2}]\right]$$

$$= \ldots = E\left[\sum_{i=1}^{l'} E[R_i | g_1 \ldots g_i]\right] \leq \quad (5)$$

$$E\left[\sum_i \frac{1-p_{gi}}{p_{gi}}\right] \leq \varepsilon N$$

where the last transition follows from equation (3).

A second theorem guarantees the expected number of tests of test-accept-reject algorithm to be bounded. The theorem is: for a test-accept-reject monitoring process, the expected number of positives is at most $\epsilon_1 N$ and the expected number of false negatives is at most $\epsilon_2 N$. the proof follows readily from the above.

With standard users, where each flag is incorrect with some (possibly unknown) probability $p_u$, we consider the minimum number of tests we need to perform to guarantee at most $\epsilon_1 N$ of false positive. Because the user is random, the only parameters we can tune are the number of tests T, the number of accepts A, and the number of rejects R with the goal of minimizing T, since it does not matter which parameters got tested:

$$T+A+R=N, Ap_u <= \epsilon_1 N, R(1-p_u) <= \epsilon_2 N, \min T$$

Thus if $p_u <= \epsilon$ then we can accept all the flags and not do any testing. On the other hand, if $p_u >= 1-\epsilon_2$, then we can reject all flags and again not perform any testing. In a general case, it can be shown that the total fraction of tested flags will be at least $1-\epsilon_1/p-\epsilon_2/1-p$. In the case when $\epsilon_2=0$, we get the total fraction of flags that needs to be tested as being at least $(p-\epsilon_1)/p$ and if $\epsilon_1=0$ it becomes $(1-p-\epsilon_2)/(1-p)$.

We now analyze the behavior of our process discussed above, and show that for a standard user, the process is competitive with respect to the optimal process described above. In order to show that, we prove that if $p <= \epsilon$, then the expected number of tests is o(N), and if $p >= \epsilon$, then it is bounded by 4OPT. The analysis below is very likely to be not tight, and providing a tighter constant is an interesting open problem.

As a third theorem (whose proof is provided in a separate section below), for a user which produces false flags with probability p, a test-accept process performs $\epsilon n^{p/\epsilon}$ tests, if $p <= \epsilon$, and $\gamma n + c$, where $\gamma = 4(p-\epsilon)/p$ and $c = O(1)$ if $p >= \epsilon$ tests in expectation after n flags. Similarly test-reject algorithm performs at most $\beta n^{(1-p)/\epsilon}$, if $p >= 1-\epsilon$, and $4((1-p-\epsilon)/(1-p))$ (n+c) otherwise.

As a proof of the third theorem. suppose our target is E fraction of errors. It is easy to see that the process can be reformulated as follows. At step i, test with probability $1/(1+\epsilon i)$, and every time the item is tested, the probability of testing resets back to 1 with probability p. The question then becomes what is the expected number of tests we will perform? The full proof is given below.

A fourth theorem is directed to establishing that the symmetric test-accept-reject review process (whereby accept and reject decisions are tracked separately, and are switched with respect to their active or passive status) described above produces at most 4OPT. Under the theorem, consider a user u, that makes a mistake with probability $p_i$ such that he submits n flags, then the number of tests performed by the test-accept-reject process is at most $4OPT+2\max(\epsilon_1, \epsilon_2)n+o(n)$.

As a proof of the theorem, because the process for every flag chooses either of the two processes (test-accept and test-reject), with the lower probability of testing, and the process that was not selected is guaranteed to decrease its testing probability. Therefore the total number of tests is the lesser of the number of tests performed by either of the processes in isolation. Thus it is sufficient to only consider $\epsilon_1 <= p <= 1-\epsilon_2$, otherwise, by theorem 3.4 the expected number of tests is o(n). For the latter case we have, the expected number of tests is:

$$t^A_{STD(p)}(n) \le 4n \min\left(1 - \frac{\varepsilon_1}{p}, 1 - \frac{\varepsilon_2}{1-p}\right).$$

If p>=½, the number of tests performed by the optimal algorithm is $$t^{OPT}_{STD(p)}(n) \ge n\left(1 - \frac{\varepsilon_1}{p}, 1 - \frac{\varepsilon_2}{1-p}\right) \ge n\left(1 - \frac{\varepsilon_1}{p} - 2\varepsilon_2\right).$$

Similarly, for p<=½ the number of tests is bounded by $$t^{OPT}_{STD(p)}(n) \ge n\left(1 - \frac{\varepsilon_1}{p}, 1 - \frac{\varepsilon_2}{1-p}\right) \ge n\left(1 - \frac{\varepsilon_1}{1-p} - 2\varepsilon_1\right),$$

combining these two inequalities with equation (6) above, we have the desired result.

EXAMPLES

The process described here was compared to an optimal process that knows user strategy in advance, on synthetic user strategies. The process was also run on real data consisting of abuse reports submitted to several different content management systems over a period of about 18 months. In each experiment, it was assumed that error level for either false positive or false negative type of errors is 0.1.

Synthetic Data:

The discussion above indicates that, for random users, the general process performs within 4OPT. In experiments with different parameters, the analysis was shown not likely to be very tight, and from the empirical dependence, it appears that the expected number is close to OPT+o(N) tests.

Figure 4A:
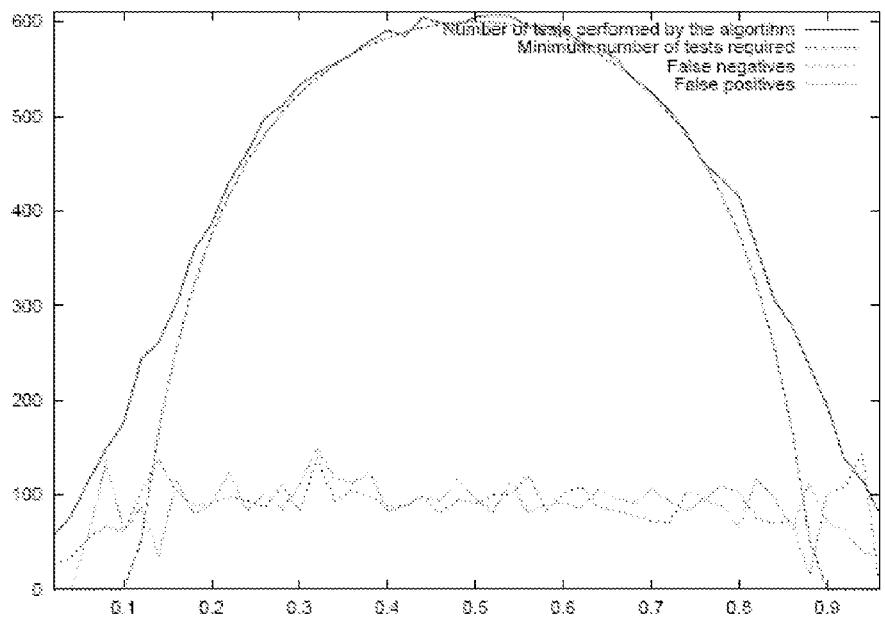
FIGS. 4A-4D show graphs of example testing data for a user review system and process.

Such a correlation is shown in plot in FIG. 4A. In that figure, the x-axis shows the probability of error by the user, while the y-axis shows the number of errors or tests (represented by p above, changing from 0.01 to 1), as the case may be. Four values are plotted on the graph. The overall data shown in the graph represents the number of tests and the number of errors using the process discussed here for random users that produces false flags with probability p, plotted against an optimal process that knows the random user parameters.

The dome-shaped solid line represents the number of test performed by the process or algorithm for a fixed acceptance error of E=0.1, while the dome-shaped dotted line shows the minimum number of tests required. The flatter lines show numbers of false positives and false negatives (where the line that starts above zero is the false negatives). In the graph, 1000 flags were assumed and the experiment was run 30 times, to get an accurate estimate of the number of tests performed.

Figure 4B:
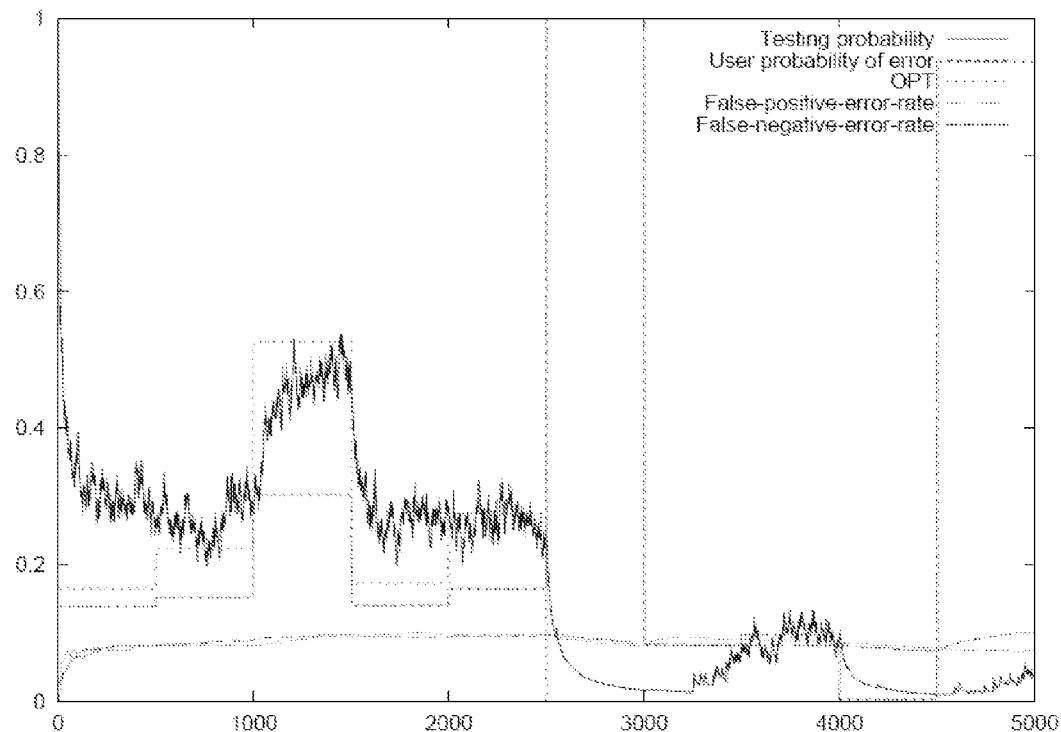

FIG. 4B shows performance of the process discussed above for a random user, where the user changes his error probability over time. The x-axis represents of flags reported, while the y-axis represents probability. The dashed squared line, that starts highest and drops to zero at 2500 flags represents OPT, while the other dashed squared line represents a user probability of error. Of the two lowest lines, the short-dashed line represents the false-positive-error-rate and the dash-dot line represents the false-negative-error-rate.

Figure 4C:
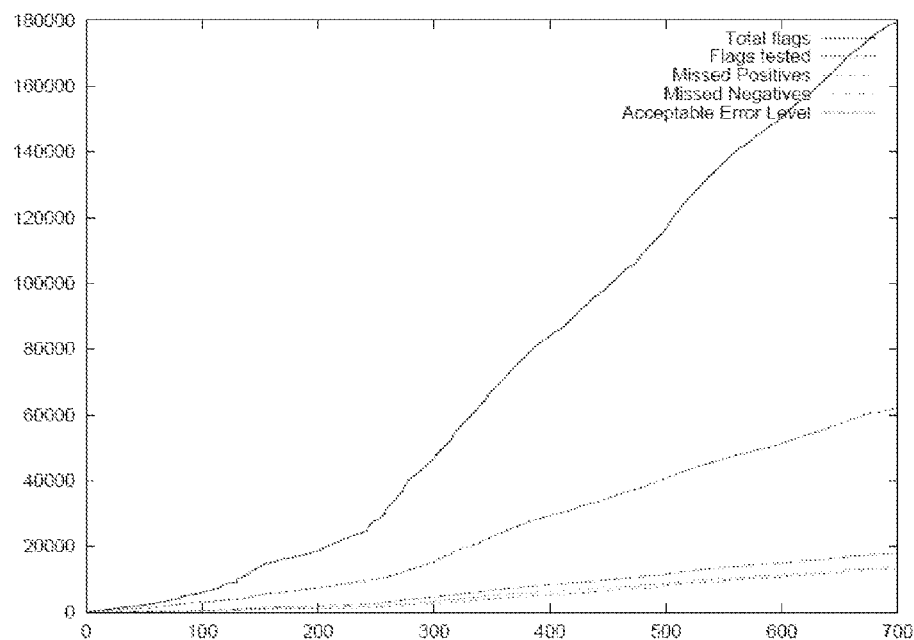

FIGS. 4C and 4C represent results of experiments performed with real data. The data contains a subset of abuse reports accumulated by various services operated by Google Inc. of Mountain View, Calif., over approximately 18 months. The dataset contained roughly about 650 randomly-selected anonymized users who submitted at least 50 reports to the system (some submitted considerably more). Their total contribution was about 230,000 flags. The process discussed above computed testing probability independently for every user, and thus the guarantees here apply for every user independently.

FIG. 4C shows the number of flags that the system tested on the x-axis, versus the number of errors on the y-axis. The top line is the total number of flags. The second line is the total number of flags that were tested. The next lines is the acceptable error level. The dotted line is missed negatives, and the lowest dashed line is missed positives.

Figure 4D:
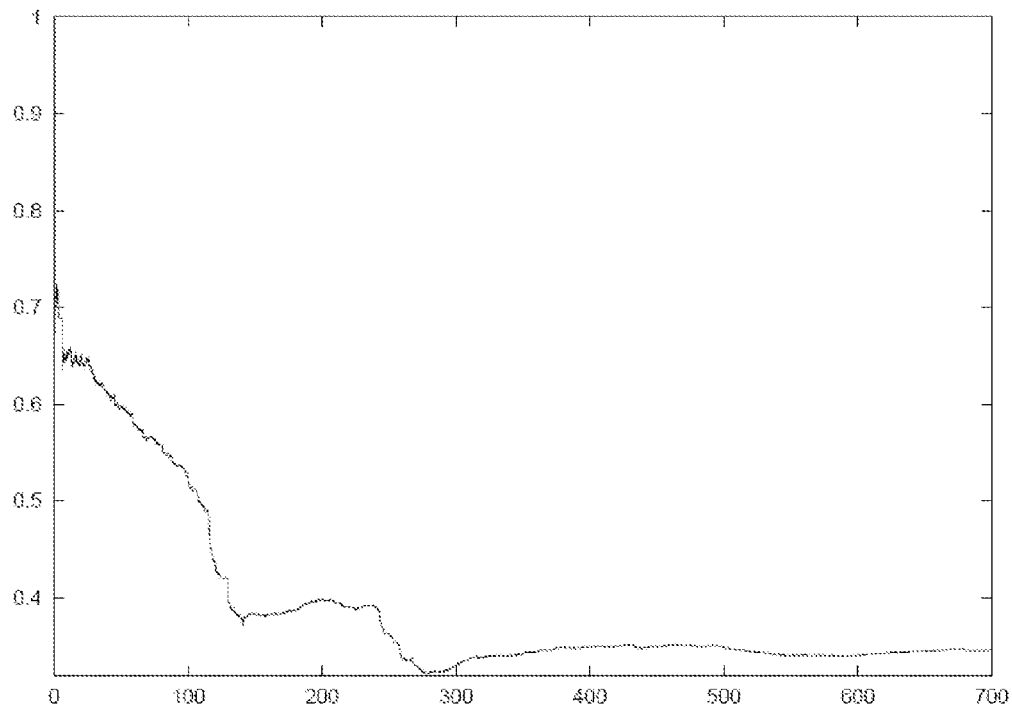

FIG. 4D shows the ratio between the number of tested flags (y-axis) and the total number of flags as a function of time (x-axis) over 700 days of data.

Figure 5:
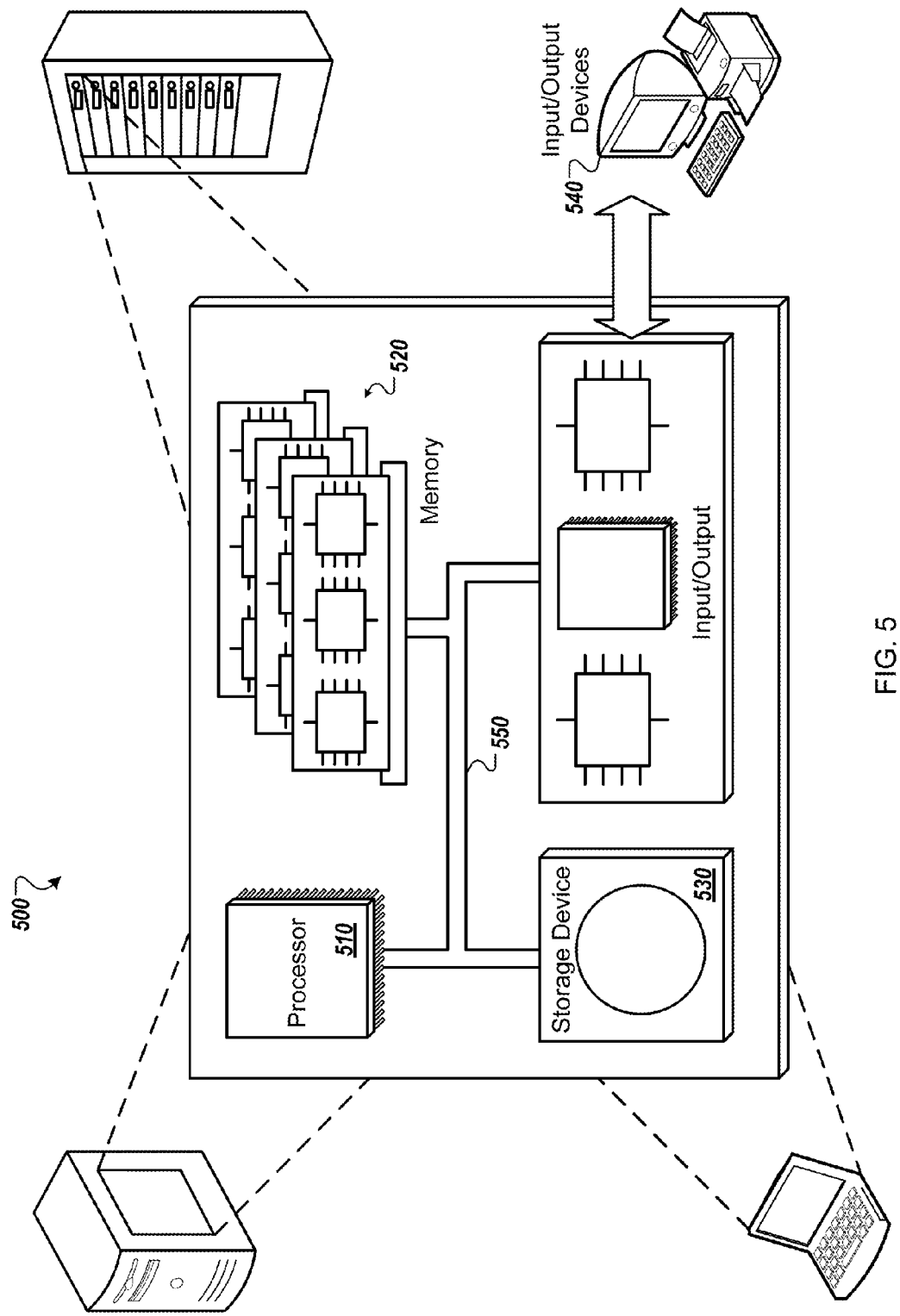
FIG. 5 shows an example of a computer device and a mobile computer device that can be used to implement the techniques described here.

FIG. 5 is a schematic diagram of a computer system 500. The system 500 can be used for the operations described in association with any of the computer-implement methods described previously, according to one implementation. The system 500 is intended to include various forms of digital computers, such as laptops, desktops, workstations, personal digital assistants, servers, blade servers, mainframes, and other appropriate computers. The system 500 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 500 includes a processor 510, a memory 520, a storage device 530, and an input/output device 540. Each of the components 510, 520, 530, and 540 are interconnected using a system bus 550. The processor 510 is capable of processing instructions for execution within the system 500. The processor may be designed using any of a number of architectures. For example, the processor 510 may be a CISC (Complex Instruction Set Computers) processor, a RISC (Reduced Instruction Set Computer) processor, or a MISC (Minimal Instruction Set Computer) processor.

In one implementation, the processor 510 is a single-threaded processor. In another implementation, the processor 510 is a multi-threaded processor. The processor 510 is capable of processing instructions stored in the memory 520 or on the storage device 530 to display graphical information for a user interface on the input/output device 540.

The memory 520 stores information within the system 500. In one implementation, the memory 520 is a computer-readable medium. In one implementation, the memory 520 is a volatile memory unit. In another implementation, the memory 520 is a non-volatile memory unit.

The storage device 530 is capable of providing mass storage for the system 500. In one implementation, the storage device 530 is a computer-readable medium. In various different implementations, the storage device 530 may be a floppy disk device, a hard disk device, an optical disk device, or a tape device.

The input/output device 540 provides input/output operations for the system 500. In one implementation, the input/output device 540 includes a keyboard and/or pointing device. In another implementation, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any appropriate combination of them. The components of the system can be connected by any appropriate form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

A number of embodiments have been described. Nevertheless, it will be understood that various modifications may be made without departing from the spirit and scope of the invention. For example, much of this document has been described with respect to particular types of review systems, but other systems may also be addressed. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A computer-implemented method for identifying on-line comments as being legitimate or illegitimate, the method comprising:
   receiving from a user of a computing service a comment directed to a first piece of on-line content;
   identifying results of reviews of one or more comments by the user directed to other pieces of on-line content;
   identifying a measure of trust associated with the user that is determined based at least on the results of the reviews of the one or more comments by the user directed to the other pieces of on-line content;
   determining whether to provide for review of the first piece of on-line content by using a random selection that randomly selects particular pieces of on-line content, from among a plurality of pieces of on-line content, to provide for review, wherein the determining comprises:
   selecting a number at random;
   adjusting the selected number up or down using the measure of trust associated with the user, and
   determining, based on the adjusted number, whether to provide the first piece of on-line content for review to determine whether the on-line content is legitimate or not,
   wherein a likelihood that the first piece of on-line content is provided for review is influenced based at least on the measure of trust associated with the user;
   taking action on changing a status of the first piece of on-line content based on the determination of whether to provide for review of the first piece of on-line content;
   iteratively providing, in a plurality of rounds that each correspond to a submission of a comment from the user, for review of a series of comments by the user and further adjusting the adjusted number up or down based on whether the reviews indicate that the comments are accurate or inaccurate; and
   determining, for each round of review, a bias level for a decision to trust the comment and a bias level for a decision to review the comment, and determining whether to make active the decision to trust the comment or the decision to review the comment, where making active defines which of the decisions will be used to control review of a comment.

2. The method of claim 1, further comprising, based on the determination of whether to provide for review, reviewing the first piece of on-line content to confirm whether the first piece of on-line content is inappropriate for further display by the computing service.

3. The method of claim 1, wherein the comment is a negative flag by the user that indicates that the first piece of on-line content is inappropriate.

4. The method of claim 1, wherein determining whether to provide for review of the first piece of on-line content comprises applying to the comment a decision set comprising trust, discard, and review.

5. The method of claim 1, further comprising saving the determined bias level for the decision to trust the comment and the determined bias level for the decision to review the comment, for use in a future round of a received user comment.

6. The method of claim 5, wherein the determination of whether to provide for review of the first piece of on-line content is based on a decision using the determination made active in a prior round of review.

7. The method of claim 1, wherein determining whether to provide for review of the first piece of on-line content comprises analyzing the first piece of on-line content and generating a reviewability rating for the first piece of on-line content that indicates a likelihood that the first piece of on-line content is legitimate or illegitimate.

8. The method of claim 7, wherein analyzing the first piece of on-line content comprises determining a category into which the first piece of on-line content was placed by a poster of the first piece of on-line content.

9. The method of claim 1, wherein:
the results of the reviews of the one or more comments by the user directed to the other pieces of on-line content indicate whether the one or more comments were respectively determined to be accurate or inaccurate,
the measure of trust associated with the user reflects whether the one or more comments by the user directed to the other pieces of on-line content were respectively determined to be accurate or inaccurate, and
the likelihood that the first piece of on-line content is provided for review is decreased as a result of the measure of trust reflecting that at least some of the one or more comments were determined to be inaccurate.

10. An on-line comment management system, comprising:
a hardware server;
software executing on the hardware server, the software comprising:
a content manager, operable on a computer server system that includes one or more processors, to provide content for review by users over a network;
a ratings interface to receive, from the users, ratings on corresponding pieces of the content; and
a ratings reviewer programmed to determine whether to review a particular rating from a particular user by performing a random selection that randomly selects particular ratings to review from among a plurality of ratings, wherein the determining comprises: selecting a number at random, adjusting the selected number up or down using results of prior reviews of ratings from the particular user, and determining, based on the adjusted number, whether to provide the first piece for review to determine whether the on-line content is legitimate or not, wherein a likelihood that the first rating is selected for review is influenced based at least on a measure of trust associated with the particular user, wherein the measure of trust is determined based at least on the results of prior reviews of ratings from the particular user, wherein the ratings reviewer is further programmed to maintain results, for each particular user, comprising a first bias for trusting a rating and a second bias for discarding a rating, and adjusting the first and second biases based on whether the review of the rating indicates that the rating was legitimate.

11. The system of claim 10, wherein the ratings are negative flags that indicate that a corresponding piece of content is inappropriate.

12. The system of claim 11, wherein the content manager is programmed to remove a piece of content if a review of a particular rating indicates that the rating is legitimate.

13. The system of claim 10, wherein the ratings reviewer is further programmed to apply to each particular rating a decision set comprising trust, discard, and review.

14. The system of claim 10, wherein the ratings reviewer is further programmed to adjust, using a result of a review of a rating by a user, a review bias to be used in determining whether to review future ratings from the user, wherein the review bias is adjusted based on whether the review of the rating indicates that the rating was legitimate.

15. The system of claim 10, wherein the ratings review is further programmed to set an active bias, from the first or second biases, wherein the active bias is used to determine whether to review a next rating from the user.

16. The system of claim 10, wherein the ratings reviewer is further programmed to determine whether to provide for review of a rating by analyzing a rated piece of content and generating a reviewability level for the rated piece of content that indicates a likelihood that the rated piece of content is legitimate or illegitimate.

17. The system of claim 16, wherein the ratings reviewer is further programmed to use the reviewability level in determining whether to review the particular rating.

18. One or more non-transitory computer-readable storage devices having instructions stored thereon that, when executed by one or more processors, cause performance of operations comprising:
receiving from a user of a computing service a comment directed to a first piece of on-line content;
identifying results of reviews of one or more comments by the user directed to other pieces of on-line content;
identifying a measure of trust associated with the user that is determined based at least on the results of the reviews of the one or more comments by the user directed to the other pieces of on-line content;
determining whether to provide for review of the first piece of on-line content by using a random selection that randomly selects particular pieces of on-line content, from among a plurality of pieces of on-line content, to provide for review, wherein the determining comprises:
selecting a number at random;
adjusting the selected number up or down using the measure of trust associated with the user; and
determining, based on the adjusted number, whether to provide the first piece of on-line content for review to determine whether the on-line content is legitimate or not,
wherein a likelihood that the first piece of on-line content is provided for review is influenced based at least on the measure of trust associated with the user;
taking action on changing a status of the first piece of on-line content based on the determination of whether to provide for review of the first piece of on-line content;
iteratively providing, in a plurality of rounds that each correspond to a submission of a comment from the user, for review of a series of comments by the user and further adjusting the adjusted number up or down based on whether the reviews indicate that the comments are accurate or inaccurate; and
determining, for each round of review, a bias level for a decision to trust the comment and a bias level for a decision to review the comment, and determining whether to make active the decision to trust the comment or the decision to review the comment, where making active defines which of the decisions will be used to control review of a comment.

19. The non-transitory computer-readable storage devices of claim 18, wherein determining whether to provide for review of the first piece of on-line content comprises applying to the comment a decision set comprising trust, discard, and review.

20. The non-transitory computer-readable storage devices of claim 18, wherein the operations further comprise iteratively providing, in a plurality of rounds that each correspond to a submission of a comment from the user, for review of a series of comments by the user and adjusting the number up or down based on whether the reviews indicate that the comments are accurate or inaccurate.

* * * * *